United States Patent [19]

Blanchard

[11] Patent Number: 4,844,494

[45] Date of Patent: Jul. 4, 1989

[54] COLLAPSIBLE VEHICLE

[76] Inventor: Pierre Blanchard, 136 Fournier Street, Apt. 11, Granby, Canada, J2J 1P4

[21] Appl. No.: 168,440

[22] Filed: Mar. 15, 1988

[51] Int. Cl.$^4$ .............................................. B62K 21/24
[52] U.S. Cl. .................................... 280/278; 280/287; 280/302; 280/87.05
[58] Field of Search ........................ 280/281, 278, 287

[56] References Cited

U.S. PATENT DOCUMENTS

| 1,468,161 | 9/1923 | Laystrom | 280/302 |
| 3,419,283 | 12/1968 | Newland | 280/287 |
| 3,434,558 | 3/1969 | Allen | 280/287 |
| 3,623,749 | 11/1971 | Jensen | 280/287 |
| 3,979,136 | 9/1976 | Lassiere | 280/278 |
| 4,067,732 | 9/1977 | Williams et al. | 280/287 |
| 4,111,447 | 9/1978 | Ishida | 280/278 |
| 4,526,390 | 7/1985 | Skolnik | 280/87.04 R |

Primary Examiner—Charles A. Marmor
Assistant Examiner—Donn McGiehan

[57] ABSTRACT

A bicycle which comprises a frame carrying at its rear end a wheel actuated by a pedal mechanism while the front end carries a collar. A brace is pivoted to the frame in the region of the pedal mechanism and so is a saddle post. The front end of the brace also carries a collar, both collars are slideable along an upright stem carrying the handle bars at the upper end and the front wheel of the bicycle at its lower end. A latch releasably holds the frame collar on the lower end of the stem while a cable attached at both ends to the handle bar and to the brace collar and also attached to the brace collar serves to maintain the latter in an intermediate position along the stem, whereby the brace, the front portion of the frame and the lower part of the stem forms a triangle holding the bicycle in erected position. A releasable stay rod pivotally connected to the saddle post and releasably latched to the rear portion of the frame, maintains the saddle in erected position.

16 Claims, 4 Drawing Sheets

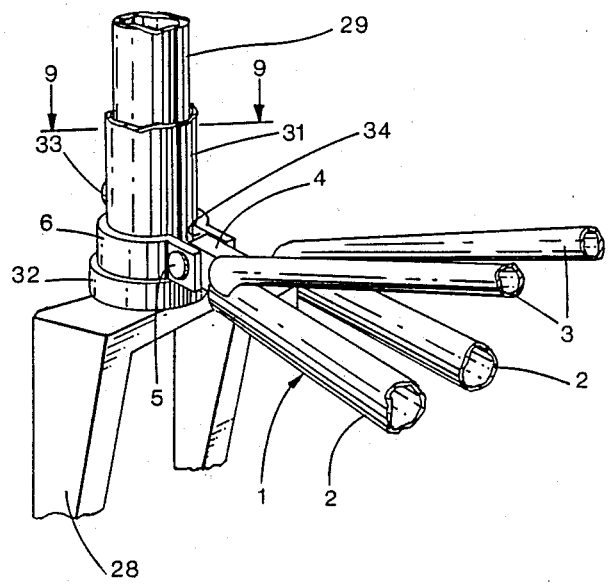
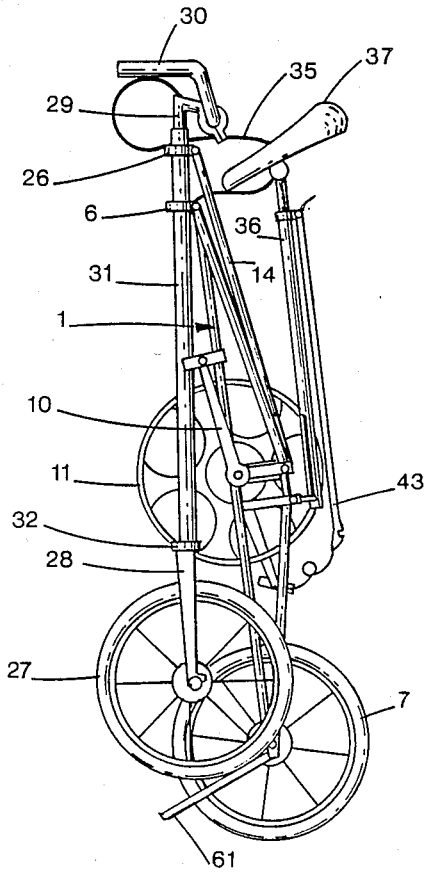
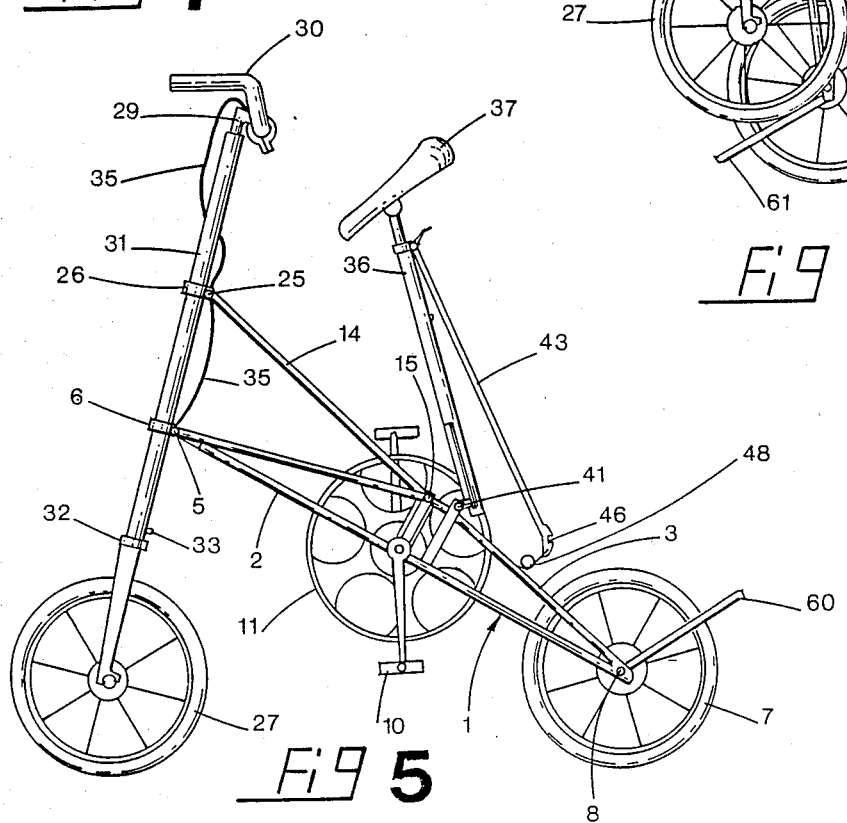
Fig 7
Fig 6
Fig 5

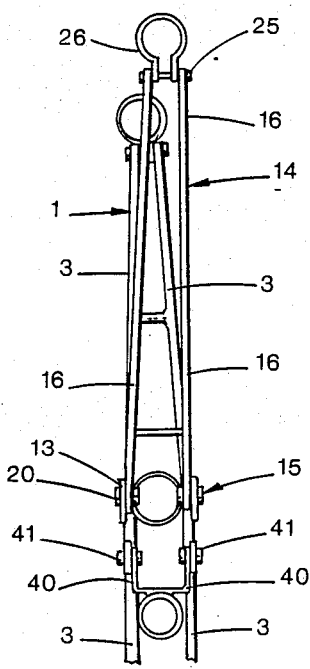
_Fig_ 8
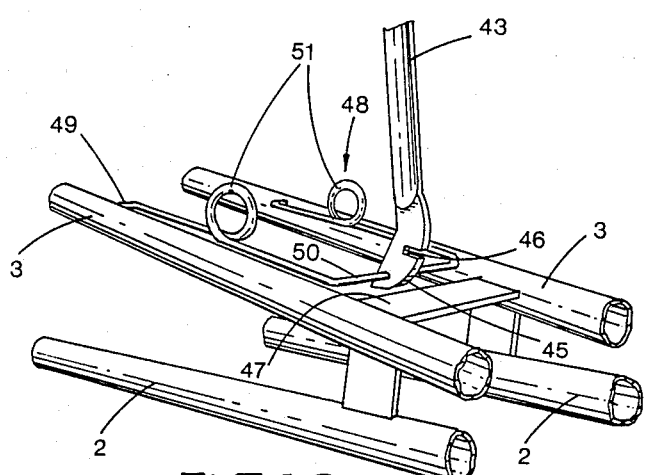
_Fig_ 12
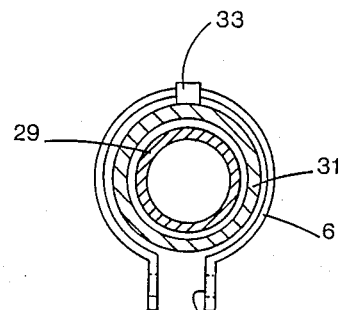
_Fig_ 9
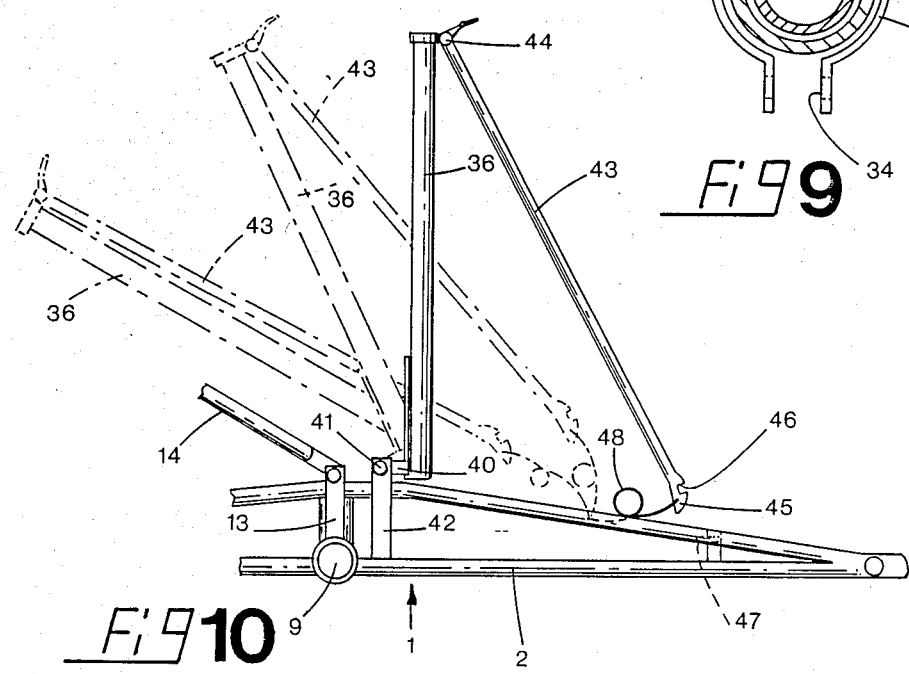
_Fig_ 10

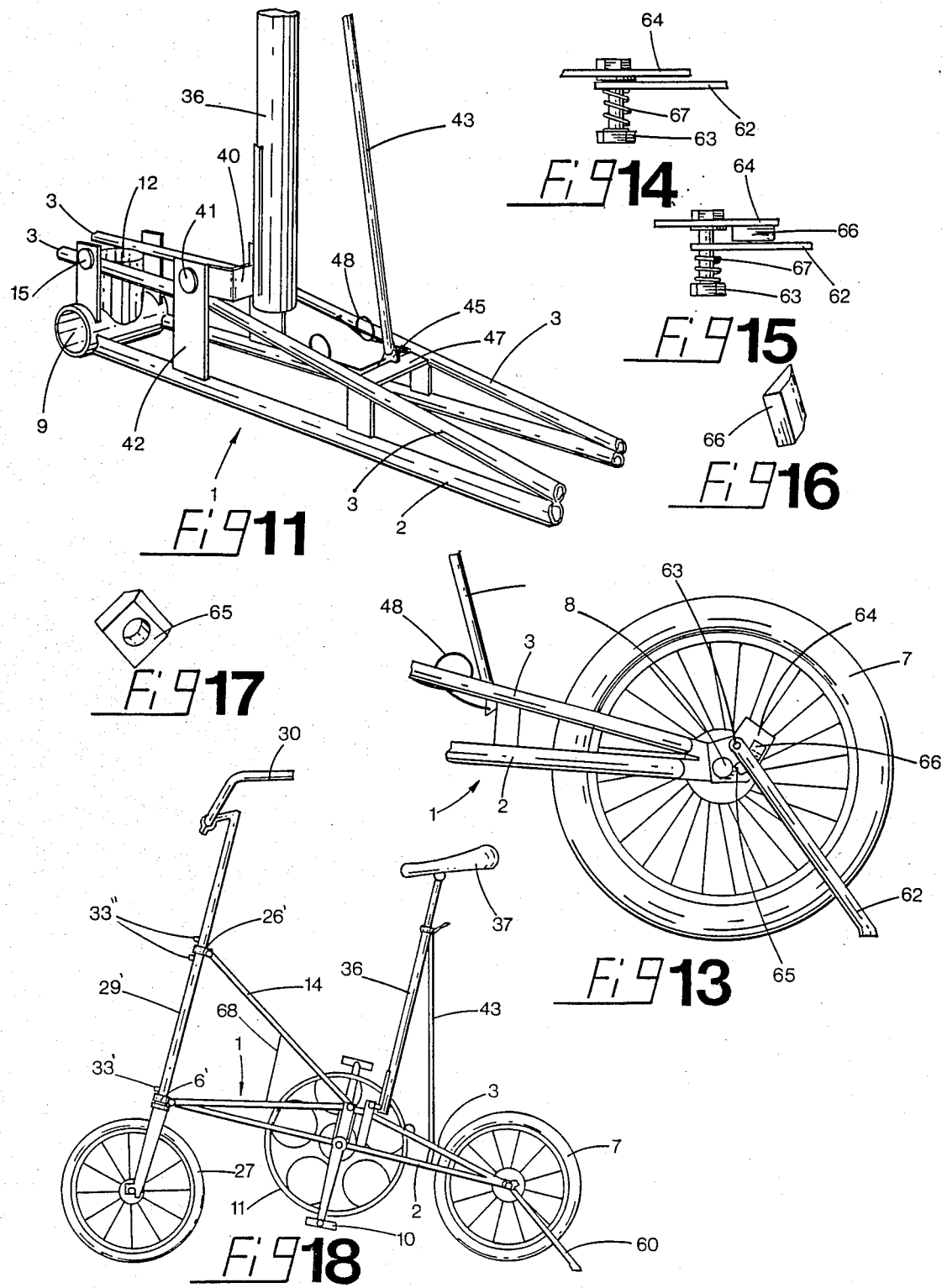

COLLAPSIBLE VEHICLE

FIELD OF THE INVENTION

The present invention relates to a collapsible vehicle, and more particularly to a collapsible cycle such as a tricycle or bicycle.

BACKGROUND OF THE INVENTION

Pedal-actuated bicycles and tricycles must be as light as possible to be efficient and yet their frame must be strong enough to withstand road bumps without affecting the wheel alignment. Bicycles and the like vehicles take a lot of room when not in use. It is therefore desirable to provide a collapsible bicycle or tricycle since storage room is less and less available in present day housing accomodations. Previous attempts at providing collapsible bicycles are shown in the following U.S. Pat. Nos. 3,419,283 dated Dec. 31, 1968 in the name of D. E. Newland; 3,949,136 dated Sept. 7, 1976 in the name of Lassiere; and 4,111,447 dated Sept. 5, 1978 in the name of Ishida.

These collapsible bicycles are quite complicated and expensive in construction and lack rigidity when in erected operating position. Also, they still take up quite a bit of room when in collapsed position.

OBJECT OF THE INVENTION

The main object of the present invention is to provide a collapsible vehicle, more particularly a bicycle or tricycle which has a very light and yet very strong and sturdy frame and when, when collapsed, take very little storage room.

Another object of the invention is to provide a collapsible cycle of the character described which is very easily and quickly collapsed and unfolded.

Another object of the invention is to provide a cycle of the character described which is of simple and inexpensive construction.

Still another object of the invention is to provide a bicycle stand which holds the bicycle upright in both the erected and the collapsed condition of the bicycle.

SUMMARY OF THE INVENTION

The cycle in accordance with the invention comprises an elongated frame carrying a rear wheel at its rear end, a stem, a front wheel carried by one end of the stem, a brace in the general plane of the frame and having a rear end pivoted to an intermediate portion of said frame about a brace pivotal axis transverse to said frame, first and second connector means connecting to said stem the front ends of said frame and of said brace repsectively, both connector means shiftable along said stem and allowing rotation of said stem relative to said frame in the plane of the latter, the distance between the first connector means and the brace pivotal axis being shorter than the distance between the second connector means and the brace pivotal axis, whereby in the erected position of the cycle the two connector means are at a predetermined distance apart along said stem and the latter is maintained generally normal to said frame by the triangular arrangement of the interconnected stem, brace and frame, shifting of said two connector means along said stem in a direction away from said front wheel causing collapsing of said cycle by rotation of said stem toward a position alongside said frame.

Preferably, the brace pivotal axis is slightly transversely inclined with respect to the plane of said frame so that when said cycle is in erected position, the stem is substantially co-planar with the frame and two wheels are aligned and when said cycle is in collapsed condition, the stem is laterally inclined with respect to the plane of the frame and the front wheel can overlap the rear wheel for minimum storage room.

Latching means and holding means are provided to positively position the two connector means along the stem in the erected position of the cycle. The cycle also includes a saddle post pivoted to the frame to take an erected position upwardly extending from the frame and a collapsed position forwardly extending along the frame. A stay rod is pivoted to the outer end of the stay post and has a rearwardly facing notch engageable with a frame transverse bar to hold the post in erected position: a coil spring, pivoted to the outer end of the stay rod and to the frame, maintains the stay rod notch in engagement with the frame transverse bar in erected position of the saddle post and maintains the stay rod alongside the saddle post in the collapsed position of the latter.

The present invention is also directed to a bicycle stand which not only serves to maintain the erected cycle upright on the ground but also the collapsed cycle in an upstanding position on the ground with the frame upwardly directed from the rear wheel, the rear wheel then cooperating with the stand to form a three-point rest.

BRIEF DESCRIPTION OF THE DRAWINGS

FIG. 5 is a side elevation of the bicycle in partly collapsed position and also showing the stand in elevated ground clearing position;

FIG. 6 is a side elevation of the fully collapsed bicycle standing upright on the three-point contact provided by the stand and rear wheel;

FIG. 7 is a partial perspective view on an enlarged scale showing the front end of the frame, the lower collar in bicycle erecting position around the stem and part of the fork carrying the front wheel;

FIG. 8 is a top plan view of the frame and of the brace;

FIG. 9 is a cross-section taken along line 9—9 of FIG. 7;

FIG. 10 is a side elevation showing the rear end portion of the bicycle frame, the saddle post and its stay rod and showing, in dotted lines, an intermediate and the fully collapsed position of the saddle post and stay rod;

FIG. 11 is a partial perspective view of the bicycle frame, saddle post and stay rod, the latter in erected position;

FIG. 12 is a partial perspective view showing part of the bicycle frame, the outer end of the stay rod and of the spring means connecting the stay rod to the bicycle frame;

FIG. 13 is a partial side elevation showing the rear wheel, the bicycle stand and the rear portion of the bicycle frame;

FIGS. 14 and 15 are partial top views showing the spring loaded connection of the legs of the bicycle stand to the bicycle frame;

FIGS. 16 and 17 show parts of the releasable latching means for the bicycle stand; and FIG. 18 is a side elevation showing a second embodiment of the bicycle in erected position and held upright by the bicycle stand.

DETAILED DESCRIPTION OF THE TWO PREFERRED EMBODIMENTS

Figure 1:
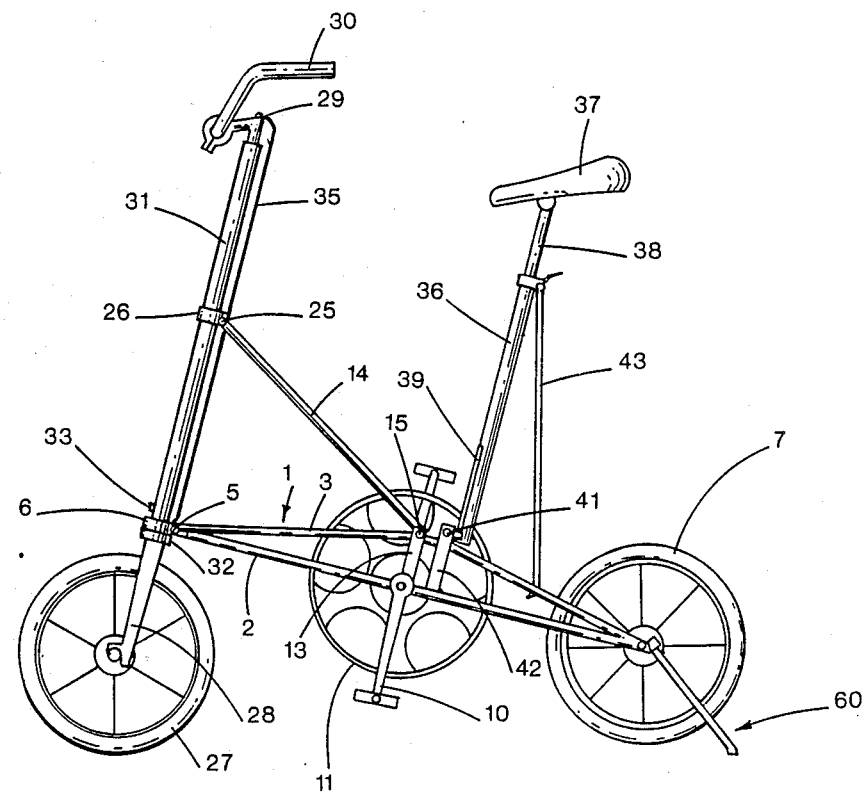
FIG. 1 is a side elevation of the first embodiment of a bicycle in accordance with the present invention shown in erected position and standing upright by means of its stand.
Figure 2:
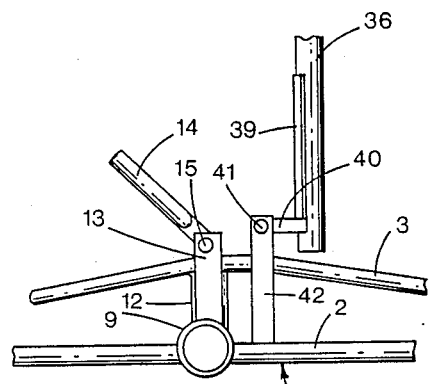
FIG. 2 is a partial side elevation of an enlarged scale of the intermediate portion of the frame showing the brace and the saddle post pivotally connected thereto.

The bicycle of the present invention comprises an elongated frame 1 of strong unitary construction consisting of two laterally spaced lower longitudinal straight rods 2 reinforced by upper angular tensioning rods 3 also laterally spaced and each extending over a lower rod 2. Rods 2 and 3 can be of tubular construction if desired.

As shown in FIG. 7, the ends of tensioning rods 3 are tapered and are welded to the lower rods 2 just short of the ends of these rods 2. The rods 2 are also transversly coverging and their front ends are welded or otherwise secured to a flat bar 4 which protrudes forwardly and to which a collar 6 is pivotally connected by means of a transverse pin 5. The rear end of frame 1 rotatably carries a rear bicycle wheel 7 about the pivotal axis 8. A tube 9 transversely extends of the intermediate portion of frame 1 between the lower rods 2 and the upper tensioning rods 3 as shown in FIG. 11. This tube rotatably receives and holds the conventional pedal mechanism 10 shown in FIG. 1 and to which is secured a large diameter sprocket wheel 11 for driving the rear wheel 7 through a conventional chain and sprocket mechanism and also there can be provided a change gear system of known construction.

A member 12 is secured to the top of tube 9 upwardly extending therefrom between the two tensioning rods 1,2; a pair of upright transversely spaced bars 13 are fixed to an intermediate portion of frame 1 more particularly to each side of member 12, just above tube 9, and extends upwardly of the tensioning rods 3.

A brace member 14 (see FIGS. 1 and 8) is pivotally connected at its rear end to the bars 13 by means of a brace pivotal connection 15. The brace 14 consists of two longitudinal members 16 interconnected at their front end by a bight member 17.

Figure 3:
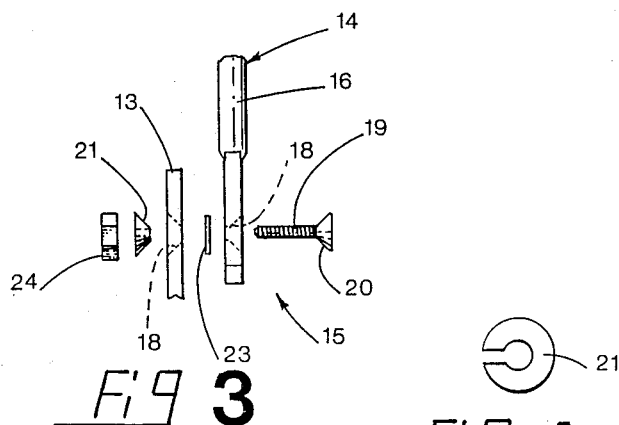
FIG. 3 is an exploded view of the parts forming the pivotal connection of the brace to the frame.
Figure 4:
FIG. 4 is an end elevation of the tapered bushing shown in FIG. 3.

Brace pivotal connection 15 consists of the elements shown in FIG. 3 for each member 16. Bar 13 and the rear end of member 16 has tapered bores 18 one for receiving a bolt 19 with a tapered head 20, the other for receiving a tapered bushing 21 which is radially split as shown in FIG. 4 at 22. The connection is completed by an intermediate washer 23 and a nut 24 screwing on the bolt 19. Tightening of the bolt causes the split bushing 21 to grip on the bolt threads. Bushing 21 and washer 23 are made of brass to prevent friction between parts 13 and 16 and between bushing 21 and part 13. A very secure pivotal connection is obtained and lateral tilting of the brace 14 is prevented since each member 16 is pivoted.

To the front end of thebrace 14 is pivotally mounted about transverse pivot pin 25, a collar 26 similar to collar 6.

The bicycle has a front wheel 27 of substantially same diameter as the rear wheel 7 which is mounted within a conventional fork 28, the upper end of which is fixed to a stem 29 which can be of tubular construction, the upper end of which carries the conventional handle bar 30, the level of which can be adjusted if desired in conventional manner. A tube 31, preferably made of plastic, completely surrounds the stem 29 and abuts at its lower end against an enlargement 32 of the stem 29. The stem 29 can rotate within the tube 31 under the action of the handle bar 30 to steer the front wheel 27. The two collars 6 and 26 are shiftable, preferably slideable, up or down along the tube 31 and consequently along the stem 29.

In the erected position of the bicycle, the lower collar 6 abuts against the enlargement 32 and is retained in this position by means of a lateral stud 33 which is fixed to and protrudes from the tube 31 and overlies the lower collar 6 when the tube is rotated so that the stud 33 extends forwardly of the bicycle. Stud 33 together with the enlargement 32 form latching means for the lower collar 6.

Referring to FIG. 7, the lower collar 6 defines a spacing 34 at the rear of the tube 31, i.e. at its connection of its ears with the frame 1. Upon rotation of the tube 31 through a half turn, its stud 33 will come in register with the spacing 34, thereby allowing upward sliding of lower collar 6 along the tube 31.

The upper collar 26 is held a predetermined distance above lower collar 6 in the erected position of the bicycle by a flexible cable 35 which is attached at its lower end to the lower collar 6, at its intermediate portion to the upper collar 26, and at its upper end to a suitable part of the handle bar asswembly 30, as shown in FIG. 1.

In the erected position of the bicycle, the cable 35 is maintained taut, the lower collar 6 being in its lowermost position and maintained in such position by the stud 33.

In the erected position of the bicycle, it will be appreciated that the front portion of the frame 1, the brace 14 and the portion of the stem 29 or tube 31 extending between the two collars 6 and 26 form a rigid triangular arrangement firmly holding the tube 31 and consequently the stem 29 in its upright position generally normal to the frame 1.

Referring to FIGS. 1, 2, 8, 10 and 11, the bicycle of the invention includes a saddle post 36 preferably of tubular construction for adjustably securing a saddle 37 carried thereby through the standard telescopic tube or rod 38. The lower end of saddle post 36 is welded or otherwise secured to a yoke 39 providing a U-shaped member 40, the two side legs of which are pivoted at 41 to a pair for laterally-spaced upright bars 42 which are secured to the rods 2 and 3 of frame 1, just rearwardly of the pedal mechanism and of the pivotal connection of the brace 14 to the frame. The saddle post 36 can thus pivot in the plane of the frame 1 forwardly of the bicycle. The saddle post 36 is maintain in erected position extending upwardly and generally normal to the elongated frame and substantially parallel to the erected stem 29 by means of a stay rod 43 which has one end pivoted to the upper end of the saddle post 36 at 44 while its lower free end forms an enlargement as shown in FIG. 12 defining a curved ramp 45 which faces rearwardly of the vehicle and is provided with a notch 46 adapted to receive and latch unto a transverse frame bar 47 of angular cross-section and rigidly secured to the frame 1, extending between the two tensioning rods 3 and secured thereto. A spring 48 is designed to bias the outer end of the stay rod 43 against the transverse bar 47 with the bar engaging notch 46 preventing accidental disengagement of the stay rod 43.

Spring 48 (FIG. 12) has a U shape, the outturned ends 49 of its legs pivotally inserted within the tensioning rods 3 and its bight 50 rotatably extending through the outer end of stay rod 43. Each leg of the spring 48 forms an intermediate loop 51 which serves to bias the stay rod against the bar 47. Upon erection of the bicycle, the saddle post 36 is pivoted rearwardly and the spring 48 pivots about its ends 49 to guide the ramp 45 against the bar 47 until the notch 46 receives the bar. The spring is then biased to maintain the lock position of the bar.

Upon collapsing of the bicycle, it is only necessary to kick the stay rod 43 to disengage the bar 47 from the notch 46 and then to pivot the saddle post 36 forwardly, the spring 48 then causes automatic pivotal movement of the stay rod 43 so that it will eventually be kept alongside the saddle post 36, as shown in FIGS. 5 and 6.

Referring to FIG. 1, it is essential that the distance between the lower collar 6 and the brace pivotal connection 15 to the frame be shorter than the distance from the upper collar 26 to the same brace pivotal connection 15.

Referring to FIG. 8, it is seen that the pivotal axis of the brace pivotal connection 15 is slightly inclined transversely to the general plane containing the frame 1. With this arrangement, it will be appreciated that when the two collars 6 and 26 are close together, there is produced an appreciable lateral shifting of the upper collar 26 with respect to the lower collar 6 and yet when the two collars are at a predetermined distance apart when the bicycle is in erected position, the two collars are practically in register in the plane containing the bicycle frame 1. It follows that in the erected position of the bicycle, the stem 29 lies in the general plane of the bicycle and therefore the two wheels are not lately tilted one with respect to the other supposing the front wheel is forwardly directed. Yet, when the bicycle is collapsed, lateral tilting of the stem enables the front wheel to overlap the rear wheel as clearly shown in FIG. 6.

To initiate collapsing movement, it is only necessary to rotate tube 31 through 180° so that its stud 33 will clear the lower collar 6 as above explained and then to pull on cable 35 which will raise the lower collar 6 and then the upper collar 26 along the tube 31. This causes relative rotation between the stem and the frame 1 in the plane of the frame as clearly shown by the sequence shown in FIGS. 5 and 6. In the final collapsed position of the bicycle, the stem extends alongside the frame and underneath the same with the two collars having reached the upper end of the tube 31. It is preferable to rotate the handle bars 30 through a 180° although this is not essential. It is noticed that in the collapsed position, the front wheel overlaps the rear wheel as it is laterally displaced therefrom. Also, the saddle post is folded on top of the frame 1 and towards the front end thereof. It is maintained in this position together with the stay rod 43 by means of the coil spring 48.

A bicycle stand 60 is provided, formed of a U-shaped bar defining a ground-engaging bight 61 and two sides 62 pivoted at 63 to a part 64 which is fixed to the rear end of the bicycle frame 1 rearwardly of the pivotal axis 8 of the rear wheel 7. A square stop 65 is welded to part 64 just forwardly of side legs 62. This stop can be a simple nut as shown in FIG. 17. A ramp 66 (see FIG. 16) is fixed on the otherwide of each leg 62 to part 64 so as to maintain the side legs 62 at a rotated angle which corresponds to the position of the stand for raising the rear wheel and standing the erected bicycle upright on the ground. As shown in FIGS. 14 and 15, the pivot connections 63 are spring loaded as shown at 67. Therefore, the stand 60 can be forced to pivot rearwardly and upwardly to the rearwardly and upwardly inclined position shown in FIG. 5 which is the bicycle running position. It is to be noted that the stand serves also to maintain the completely collapsed bicycle upright on the ground as shown in FIG. 6, the stand being in the position of FIG. 13 but the frame rotated and extended upwardly from the rear wheel. The stand and the rear wheel form a three-point contact with the ground to achieve stable positioning of the collapsed bicycle which then takes up a minimum of storage room.

FIG. 18 shows a second embodiment, similar to the first embodiment, except for the following modifications.

Plastic tube is absent and collars 6' and 26' made of a size to directly slide on stem 29'. The latter has a lower lateral stud 33' to latch collar 6' and a pair of lateral studs 33" to latch collar 26' under and above the latter.

A flexible cable 68 joins brace 14 and frame 1.

Rotation of handle bar 30 through half a turn causes studs 33' and 33" to clear collars 33' and 33" and upward pulling or brace 14 brings frame 1 upwardly by cable 68 so that both collars 6' and 26' will slide upwardly on stem 29' causing bicycle collapse.

In the annexed claims, the term "cycle" includes all land vehicles, motorized or pedal actuated, of a size and weight which can be manually handled, such as bicycles, tricycles, scooters, motorcycles and the like.

What I claim is:

1. A collapsible cycle comprising an elongated frame having a rear end and a front end, a rear wheel carried by the rear end of said frame, a stem, a front wheel carried by one end of said stem, a brace in the general plane of said frame having a rear end pivoted to an intermediate portion of same frame about a brace pivotal axis transverse to said frame, first and second connector means connecting to said stem, the front end of said frame and of said brace respectively, both connector means shiftable along said stem and allowing rotation of said stem relative to said frame in the plane of the latter, the distance between the first connector means and the brace pivotal axis being shorter than the distance between the second connector means and the brace pivotal axis, whereby in the erected position of said cycle said two connector means are at a predetermined distance apart along said stem and the latter is maintained generally normal to said frame by the triangular arrangement of the interconnected stem, brace and frame; shifting of both said connector means along said stem in a direction away from said front wheel and causing said connector means to take a closer distance apart along said stem with, resulting in rotation of said stem to a position along said the side of said frame corresponding to the collapsed position of said cycle.

2. A collapsible cycle as defined in claim 1, further including latch means to releasably latch said first connector means on said stem when said cycle is in erected position.

3. A collapsible cycle as defined in claim 2, further including holding means to hold said second connector means at said predetermined distance from said first connector means when said cycle is in erected position.

4. A collapsible cycle as defined in claim 3, wherein said first and second connector means include a first and a second collar respectively, each partly surrounding said stem and enclosing a space between said collar and said stem, said latch means including a stem enlargement adjacent said front wheel and against which said first connector means abut in the erected position of said cycle and a stud laterally protruding relative to said stem and overlying said first collar in the erected position of said cycle and when said stud is in a first rotated position, rotation of said stud through half a turn from said first rotated position bringing said stud in register with said space to allow shifting of said first collar along said stem away from said front wheel.

5. A collapsible cycle as defined in claim 4, wherein said holding means include a cable means extending along said stem, attached to said second collar intermediate its ends and to said first collar at one end to the free end of said stem at its other end, said cable means being taut in the erected position of said cycle and holding said second collar at a position along said stem intermediate the ends thereof and at said predetermined distance from said first collar.

6. A collapsible cycle as defined in claim 4, wherein said stud is secured to said stem and said holding means include a pair of lateral studs laterally protruding from and secured to said stem and underlying and overlying said second collar respectively when said stem is in a first rotated position, rotation of said stem through half a turn bringing said pair of studs in register with the space of said second collar to release the second collar for shifting of same along said stem.

7. A collapsible cycle as defined in claim 3, further including a tube surrounding and longitudinally fixed relative to said stem, said first and second connector means being first and second collars partly surrounding said tube, there being a space between each collar and said tube on the side of said frame and brace, said latch means including an enlargement of said stem adjacent said front wheel and against which said first collar abuts in the erected position of the said cycle and a stud laterally protruding from said tube and overlying said first collar in a first rotated position of said tube, rotation of said tube through half a turn bringing said stud in register with said space to permit shifting of said first collar along said tube in a direction away from said front wheel.

8. A collapsible cycle as claimed in claim 7, wherein said holding means include a cable means attached to both ends to said first collar and to the upper end of said stem respectively, and attached intermediate its ends to said second collar, said cable held tight in the erected position of said cycle to thus hold said second collar at said predetermined distance from said first collar, rotation of said tube to allow unlatching of said first collar and pulling on said cable causing shifting of said first and second collars along said stem in a direction away from said front wheel to permit collapsing of said cycle.

9. A cycle as defined in claim 1, further including a saddle post pivoted to said frame adjacent said brace pivot axis for movement in the plane of said frame and stay means to releasably lock said saddle post in erected position generally normal to said frame.

10. A collapsible cycle as defined in claim 9, wherein said stay means include a stay rod pivoted to said saddle post at a distance from its pivotal connection to said frame, said stay rod having a notch at its free end portion, a transverse bar secured to said frame intermediate said frame rear end and said saddle post pivotal connection to said frame, said notch releasably receiving said transverse bar to lock said stay rod to said transverse bar whereby said stay rod maintains said saddle post in erected position.

11. A collapsible cycle as defined in claim 10, further including spring means joining said frame and said stay rod and urging said stay rod against said saddle post in the collapsed position of said cycle and urging said stay rod against said transverse bar in the erected position of said cycle.

12. A collapsible cycle as defined in claim 1, wherein said cycle is a bicycle, and wherein said brace pivotal axis makes a small angle relative to a transverse axis normal to said frame, and further including a handle bar fixed to the upper end of said stem to steer said front wheel by rotation of said stem, said stem, when said bicycle is in erected position, being substantially co-planar with said brace and said frame, and when said bicycle is in collapsed position, being transversely tilted relative to the plane of said frame so that the front wheel overlaps said rear wheel.

13. A collapsible cycle as defined in claim 1, wherein said brace comprises two interconnected, transversely spaced longitudinal brace members, each pivoted at its rear end to said frame by a pivotal assembly at said brace pivotal axis.

14. A collapsible cycle as defined in claim 13, wherein each pivotal assembly includes a bolt having a conical head, a radially split conical bushing receiving said bolt with the conical surfaces of said head and busing facing each other, a nut screwed on said bolt for biasing and bushing towards said head, said bushing and said head fitted within respective mating conical bores of said frame and brace member.

15. A collapsible cycle as defined in claim 1, and being a bicycle, and further including a U-shaped bicycle stand having a bight adapted to extend across the rear wheel and to engage the ground and upstanding side legs having their free ends pivotally mounted to the rear end of said frame, latch means to releasably selectively maintain said stand in a rearwardly downwardly inclined first position and a ground clearing rearwardly upwardly inclined second position, said stand also holding said frame in an upright position in collaboration with said rear wheel when said cycle is in collapsed position and said stand in said first position.

16. In a collapsible bicycle having a frame with front and rear wheels carried at the front and rear end of said frame, a saddle post pivoted to an intermediate position of said frame for movement in the general plane of said frame between an erected position extending generally normal to said frame and a collapsed position extending along said frame, a stay rod for maintaining said saddle post in erected position, said stay rod having one end pivoted to the outer end portion of said saddle post and a free end formed with a notch facing away from said saddle post, said frame having a transverse bar engageable into said notch to lock said stay rod and maintain said saddle post in erected position and further including a spring having one end pivoted to said frame, and the other end pivoted to said stay rod at the free end thereof, said spring having an intermediate loop, said spring urging said stay rod against said transverse bar and engagement of the latter into said notch in the erected position of said saddle post and stay rod, said spring pivoting relative to said frame and stay rod when said saddle post is pivoted to its collapsed position and urging said stay rod to a position alongside said stay post in the collapsed position of the said stay post.

* * * * *